United States Patent
Huard et al.

(10) Patent No.: US 11,809,893 B2
(45) Date of Patent: Nov. 7, 2023

(54) SYSTEMS AND METHODS FOR COLLAPSING RESOURCES USED IN CLOUD DEPLOYMENTS

(71) Applicant: Dell Products, L.P., Round Rock, TX (US)

(72) Inventors: Jesse A. Huard, St. Albert (CA); Victor Salamon, Edmonton (CA)

(73) Assignee: Dell Products L.P., Round Rock, TX (US)

(*) Notice: Subject to any disclaimer, the term of this patent is extended or adjusted under 35 U.S.C. 154(b) by 179 days.

(21) Appl. No.: 17/473,204

(22) Filed: Sep. 13, 2021

(65) Prior Publication Data

US 2023/0078518 A1 Mar. 16, 2023

(51) Int. Cl.
*G06F 15/173* (2006.01)
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC ............... G06F 9/45558; G06F 9/5077; G06F 2009/4557; G06F 2009/45595; G06F 2009/45591; G06F 9/45533; G06F 11/008; G06F 11/0712
See application file for complete search history.

(56) References Cited

U.S. PATENT DOCUMENTS

| 2019/0361753 A1* | 11/2019 | Macha | G06F 11/3006 |
| 2022/0167187 A1* | 5/2022 | Jia | H04L 43/065 |
| 2023/0028934 A1* | 1/2023 | Shetty | H04L 67/60 |

* cited by examiner

*Primary Examiner* — John B Walsh
(74) *Attorney, Agent, or Firm* — Fogarty LLP (57) ABSTRACT

Methods and systems are provided for managing a cloud deployment of software applications. A plurality of virtual machines of the cloud deployment that are used to operate the software applications are defined. Network communications between the virtual machines are monitored to measure bandwidth utilization by the virtual machines. Resource utilization by each of the virtual machines, such as memory, storage and processor usage, are also monitored. Availability constraints for the software applications are determined. A resource utilization function is defined for the deployment of the software applications for operation on some or all of the virtual machines within the availability constraints. The resource utilization function is solved to determine an updated cloud deployment of the software applications on a selected portion of the virtual machines. The cloud deployment is reconfigured to utilize the selected portion of the virtual machines, thus collapsing the resources utilized by the cloud deployment.

17 Claims, 4 Drawing Sheets

SYSTEMS AND METHODS FOR COLLAPSING RESOURCES USED IN CLOUD DEPLOYMENTS

FIELD

The present disclosure generally relates to Information Handling Systems (IHSs), and, more particularly, to support efficient utilization of IHS resources in cloud application deployments.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within datacenter environments. A datacenter may include a large number of IHSs, such as rack-mounted servers and blade servers that are stacked and installed within an enclosure, which may then be installed in a rack. A datacenter may include large numbers of such server racks that are organized into rows of racks. Administration of such large groups of IHSs may require teams of remote and local administrators working in shifts in order to support around-the-clock availability of the datacenter operations while minimizing downtime. Identifying and resolving technical issues in such an environment is challenging. In response, recent IT management has seen many enterprise workloads shift from private datacenter deployments to the use of cloud solutions that offering on-demand virtual resources. Cloud deployments offer advantages over private datacenter management, such as lower barriers to entry, lower capital expenditures, and the ability to scale services dynamically according to real-time demand. Cloud providers may charge for use of computing resources based on time, for network resources by amount of data transferred, and for memory and storage based on capacity. These costs for a cloud deployment begin to accumulate as soon as resources are reserved, regardless of whether they are being used.

SUMMARY

In various embodiments, methods are provided for managing a cloud deployment of one or more software applications. The methods may include: defining a plurality of virtual machines of the cloud deployment that are used to operate the software applications; monitoring network communications between the defined virtual machines of the cloud deployment; monitoring resource utilization by each of the defined virtual machines of the cloud deployment; determining availability constraints for one or more of the software applications; defining a resource utilization function for the deployment of the software applications for operation on a plurality of the defined virtual machines withing the availability constraints; solving the resource utilization function to determine an updated cloud deployment of the software applications on a first portion of the defined virtual machines; and reconfiguring the cloud deployment to utilize the first portion of the defined virtual machines to support the software applications.

In some method embodiments, the availability constraints specify required availability of the one or more software applications in two or more cloud regions. In some method embodiments, the two or more cloud regions are each implemented using different groups of IHSs. In some method embodiments, the different set of IHSs are located at different geographic locations. In some method embodiments, the resource utilization function restricts separate instances of the one or more software applications to operation by virtual machines hosted in the two or more cloud regions. In some method embodiments, the monitored resource utilization by each of the defined virtual machines comprises at least one of a processor utilization, memory utilization and data storage utilization by the respective virtual machines. In some method embodiments, the reconfigured cloud deployment that utilizes the first portion of the defined virtual machines reduces a resource footprint of the cloud deployment. In some method embodiments, the monitored network communications between the virtual machines comprises network traffic between the different groups of IHSs. In some method embodiments, the reconfigured cloud deployment that utilizes the first portion of the defined virtual machines reduces a number of network communication channels between virtual machines on different IHSs. In some method embodiments, the reconfigured cloud deployment that utilizes the first portion of the defined virtual machines combines two or more of the software applications into one of the first portion of the defined virtual machines.

In various additional embodiments, systems are provided that may include: a plurality of IHSs (Information Handling Systems) installed in a plurality of datacenters and hosting a cloud deployment of one or more software applications; and an administrative software tool provided for managing the cloud deployment of one or more software applications, wherein the tool is configured to: define a plurality of virtual machines of the cloud deployment that are used to operate the software applications; monitor network communications between the defined virtual machines of the cloud deployment; monitor resource utilization by each of the defined virtual machines of the cloud deployment; determine availability constraints for one or more of the software applications; define a resource utilization function for the deployment of the software applications for operation on a plurality of the defined virtual machines withing the availability constraints; solve the resource utilization function to determine an updated cloud deployment of the software applications on a first portion of the defined virtual machines; and reconfigure the cloud deployment to utilize the first portion of the defined virtual machines to support the software applications.

In some system embodiments, the monitored resource utilization by each of the defined virtual machines comprises at least one of a processor utilization, memory utilization and data storage utilization by the respective virtual machines. In some system embodiments, the reconfigured cloud deployment that utilizes the first portion of the defined virtual machines reduces a resource footprint of the cloud deployment. In some system embodiments, the availability constraints specify required availability of the one or more software applications in two or more cloud regions. In some system embodiments, the reconfigured cloud deployment that utilizes the first portion of the defined virtual machines reduces a number of network communication channels between virtual machines on different IHSs. In some system embodiments, the reconfigured cloud deployment that utilizes the first portion of the defined virtual machines combines two or more of the software applications into one of the first portion of the defined virtual machines.

In various additional embodiments, a computer-readable storage device includes instructions stored thereon for managing a cloud deployment of one or more software applications. Execution of the instructions by one or more processors causes the one or more processors to: define a plurality of virtual machines of the cloud deployment that are used to operate the software applications; monitor network communications between the defined virtual machines of the cloud deployment; monitor resource utilization by each of the defined virtual machines of the cloud deployment; determine availability constraints for one or more of the software applications; define a resource utilization function for the deployment of the software applications for operation on a plurality of the defined virtual machines withing the availability constraints; solve the resource utilization function to determine an updated cloud deployment of the software applications on a first portion of the defined virtual machines; and reconfigure the cloud deployment to utilize the first portion of the defined virtual machines to support the software applications.

In some storage device embodiments, wherein the monitored resource utilization by each of the defined virtual machines comprises at least one of a processor utilization, memory utilization and data storage utilization by the respective virtual machines. In some storage device embodiments, the reconfigured cloud deployment that utilizes the first portion of the defined virtual machines reduces a resource footprint of the cloud deployment. In some storage device embodiments, the availability constraints specify required availability of the one or more software applications in two or more cloud regions.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
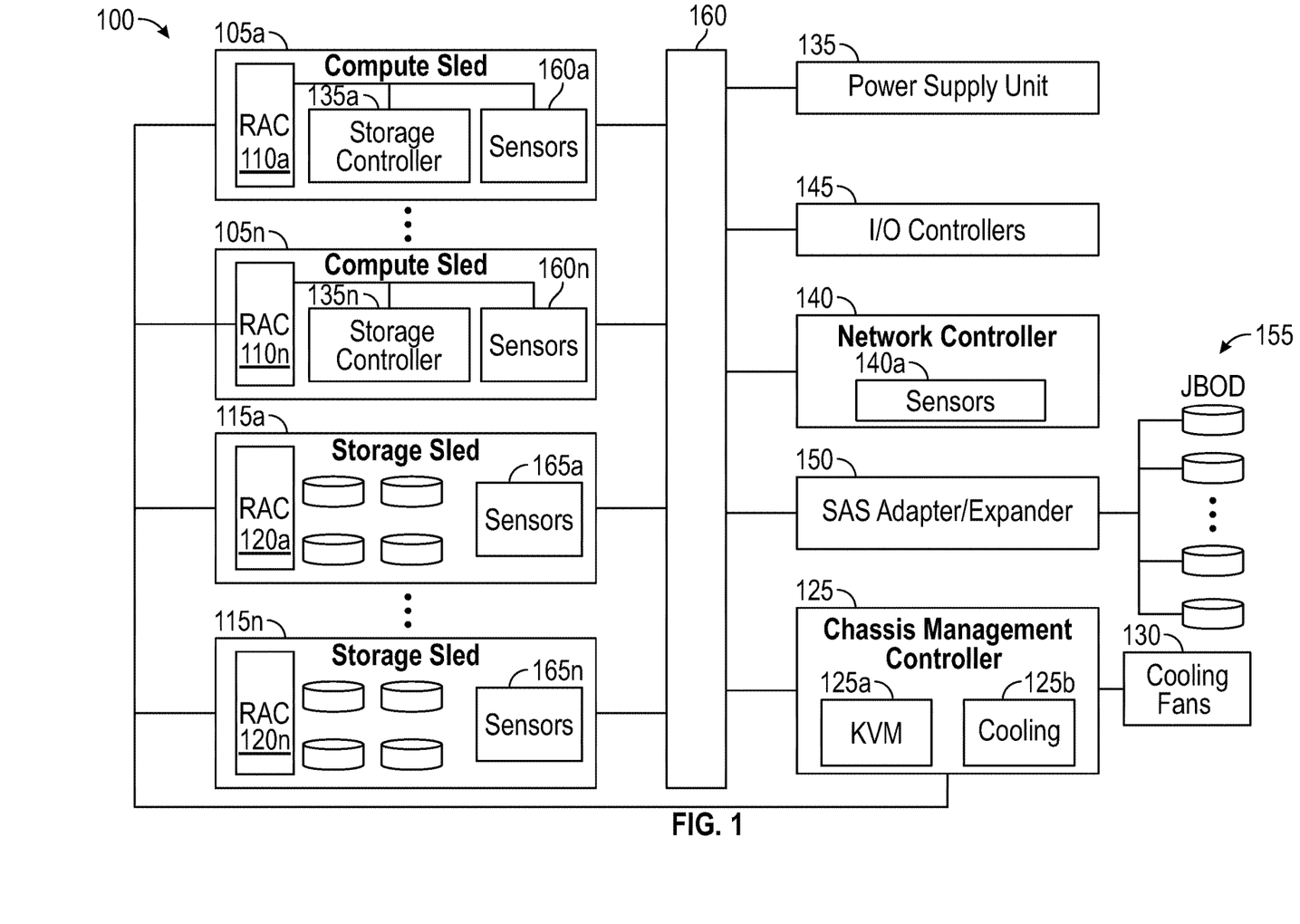
FIG. 1 is a diagram illustrating certain components of a chassis, according to some embodiments, for supporting cloud deployments and collapsing of resources used in these cloud deployments.

FIG. 1 is a block diagram illustrating certain components of a chassis 100 comprising one or more compute sleds 105a-n and one or more storage sleds 115a-n that may be configured to implement the systems and methods described herein for supporting cloud deployments and collapsing of resources used in these cloud deployments. Chassis 100 may include one or more bays that each receive an individual sled (that may be additionally or alternatively referred to as a tray, blade, server, drive and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the ongoing operations of the other sleds installed in the chassis 100.

Multiple chassis 100 are typically housed within a rack, with each chassis installed in one or more slots of the rack. Data centers may utilize large numbers of racks, with various different types of chassis installed in the various rack configurations. The modular architecture provided by the sleds, chassis and rack allow for certain resources, such as cooling, power and network bandwidth, to be shared by the compute sleds 105a-n and storage sleds 115a-n, thus providing efficiency and supporting various types of computational loads.

Chassis 100 may be installed within a rack that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n that are installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to connectors provided by front-facing bays of the chassis 100, where these connectors physically and electrically couple an individual sled to a backplane 160 of the chassis, where the backplane may be additionally or alternatively be referred to as a midplane. Chassis backplane 160 may be a printed circuit board that includes electrical traces and connectors that are configured to route signals between components of chassis 100 that are connected to the backplane 160. In various embodiments, backplane 160 may include various additional components, such as cables, wires, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
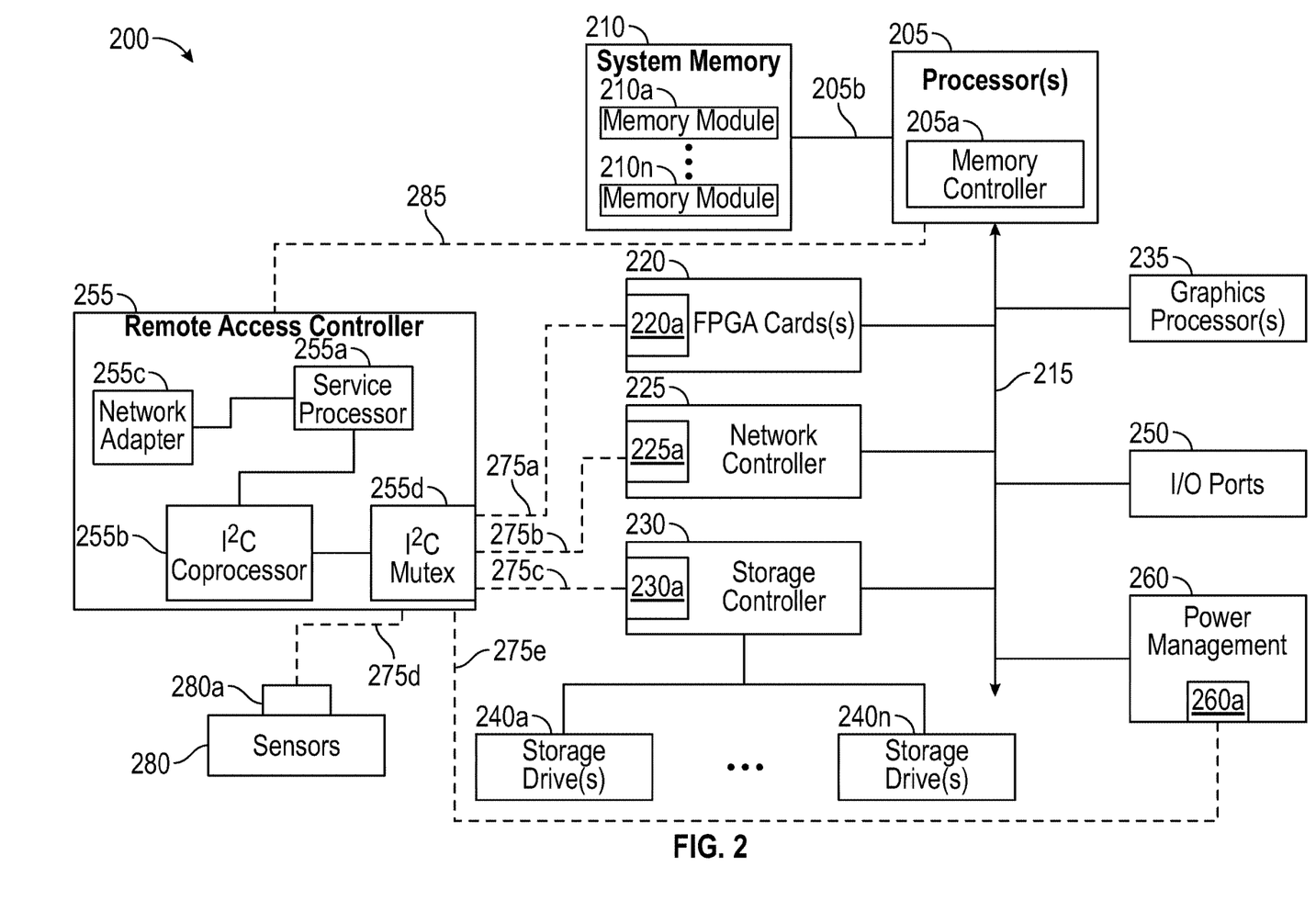
FIG. 2 is a diagram illustrating certain components of an IHS configured as a component of chassis, according to some embodiments, for supporting cloud deployments and collapsing of resources used in these cloud deployments.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, each remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. As illustrated, each compute sled 105a-n may include one or more sensors 160a-n that may generate various types of telemetry data that characterizes aspects of the operation of a respective compute sled 105a-n. For instance, sensors 160a-n may generate and/or collect telemetry data characterizing the performance of processing, networking, power and/or memory components of a compute sled 105a-n, as well as telemetry data from monitoring environmental properties, such as compute sled temperatures. In some embodiments, remote access controller 110a-n may track compute sled resource usage by individual virtual machines operating on compute sleds 105a-n, thus supporting tracking of compute sled resources used by these virtual machines and in reducing the resource footprints of these virtual machines, such as described in additional detail below.

As described in additional detail below, each compute sled 105a-n may be used to support one or more virtual machines that operate in support of cloud deployments. In some instances, the compute sleds 105a-n of chassis 100 may support many virtual machine instances operating in support of many different cloud deployments. In some instances, chassis 100 may be designated as a cloud region, or a member of a cloud region, that implements cloud resources separate from another cloud region that may be implemented by one or more other similarly configured chassis 100 that may be located in a different data center from chassis 100, thus providing redundant geographic distribution of the cloud resources in a manner that improves availability of the cloud resources and mitigates risk of data loss. As described in additional detail below, embodiments support collapsing of one or more virtual machines operating on chassis 100 in support of a cloud deployment in a manner that reduces the resource footprint of a cloud deployment.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150. In some embodiments, storage controller 135a-n may track data storage by individual virtual machines operating on compute sleds 105a-n, thus supporting tracking of storage resources used by these virtual machines and in reducing the resource footprints of these virtual machines.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n may include one or more sensors 165a-n. The sensors 165a-n may generate various types of telemetry data that characterize aspects of the operation of a respective storage sled 115a-n. For instance, sensors 165a-n may generate and/or collect telemetry data characterizing the performance of a storage sled 115a-n, such as data transfer rates and hard disk drive RPMs, as well as telemetry data from monitoring environmental properties, such as storage sled temperatures. In some embodiments, storage sled 115a-n may track data storage by individual virtual machines operating on compute sleds 105a-n, thus supporting tracking of storage resources used by these virtual machines and in reducing the resource footprints of these virtual machines.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some instances, each of the storage drives and the SAS expander may generate telemetry and/or error data that may be reported to a chassis management controller 125.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. As with compute sleds 105a-n and storage sleds 115a-n, network controller 140 may include one or more sensors 140a that may include physical sensors, such as a temperature sensor providing thermal metrics, and logical sensors, such as capabilities reporting metrics of input and output data transfer rates. As with the sensors of compute sleds 105a-n and storage sleds 115a-n, the sensors 140a of network controller 140 may be configured to generate and report this telemetry data. In some embodiments, network controller 140 may monitor network traffic between virtual machines operating on compute sleds 105a-n and virtual machines operating on other chassis 100, thus supporting the tracking of network bandwidth used by these virtual machines and in reducing the resource footprints of these virtual machines.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that provides chassis 100 with redundant, hot-swappable power supply units. Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100.

In addition to providing support for KVM 125a capabilities for administering chassis 100, a chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125. In some embodiments, the operations of a chassis management controller 125 may be implemented by one of the compute sled or storage sled remote access controllers 110a-n, 120a-n that has been designated and configured for managing chassis-level configurations.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting cloud deployments and collapsing of resources used in these cloud deployments. It should be appreciated that although the embodiments described herein may describe an IHS that is a compute sled, server or similar computing component that may be deployed within a rack-mounted chassis, other embodiments may be utilized with other types of IHSs. In the illustrative embodiment of FIG. 2, IHS 200 may be a computing component, such as compute sled 105a-n, that is configured to share infrastructure resources provided by a chassis 100. In some embodiments, IHS 200 may be a server, such as a 1RU (Rack Unit) server, that is installed within a slot of a chassis, such as a 2RU chassis, with another 1RU IHS server installed in the other slot of the chassis.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may be used in operating multiple virtualized computing environments. In certain embodiments, one or all of processor(s) 205 may be graphics processing units (GPUs) in scenarios where IHS 200 has been configured to support functions such as multimedia services and graphics applications.

In some embodiments, processor 205 may be configured to operate as a source of telemetry data providing physical sensor data, such as junction temperatures and power consumption. Processor 205 may also be configured to operate as a source logical telemetry data, such as remaining CPU processing capacity. In some embodiments, processor 205 may be configured by remote access controller 255 to generate telemetry data that is reported to the remote access controller, where the configuration and reporting of this telemetry data may be via a PECI (Platform Environment Control Interface) bus 285 operations. In some embodiments, remote access controller 255 may utilize this data in tracking processor 205 usage by individual virtual machines operating on IHS 200, thus supporting tracking of processor 205 usage by these virtual machines and in reducing the resource footprints of these virtual machines, such as described in additional detail below.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 200 via a high-speed memory interface 205b. In some embodiments, memory controller 205a may be configured to operate as a source of telemetry data capable of generating reports that are reported to remote access controller 255. The telemetry data reported by memory controller 205a may include metrics such as the amount of available system memory 210 and memory transfer rates via memory interface 205b. In some embodiments, remote access controller 255 may utilize this data in tracking system memory 210 usage by individual virtual machines operating on IHS 200, thus supporting tracking of memory 210 usage by these virtual machines and in reducing the resource footprints of these virtual machines.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory. In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a specific type of removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

In the illustrated embodiments, processor(s) 205 is coupled to a network controller 225, such as provided by a Network Interface Controller (NIC) that is coupled to the IHS 200 and allows the IHS 200 to communicate via an external network, such as the Internet or a LAN. As illustrated, network controller 225 may be instrumented with a controller or other logic unit 225a that supports a sideband management connection 275b with remote access controller 255. Via the sideband management connection 275b, network controller 225 may be configured to operate as a source of telemetry data that may include environmental metrics, such as temperature measurements, and logical sensors, such as metrics reporting input and output data transfer rates. In some embodiments, remote access controller 255 may utilize this data in tracking system memory 210 usage by individual virtual machines operating on IHS 200, thus supporting tracking of network bandwidth used by these virtual machines and in reducing the resource footprints of these virtual machines. In some embodiments, network controller 225 and remote access controller 255 may interoperate in correlating network traffic measurements by network controller 225 with operating system process information for individual virtual machines in order to identify external network traffic, supported by network controller 225, between virtual machines operating on IHS 200 and on virtual machines on other IHSs.

Processor(s) 205 may also be coupled to a power management unit 260 that may interface with the power system unit 135 of the chassis 100 in which IHS 200 may be installed. As with network controller 225, power management unit 260 may be instrumented with a controller or other logic unit 260a that supports a sideband management connection 275e with remote access controller 255. Via the sideband management connection 275e, power management unit 255 may be configured to operate as a source of telemetry data that may include physical sensors, such as a sensors providing temperature measurements and sensors providing power output measurements, and logical sensors, such as capabilities reporting discrete power settings.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. FGPA card 220 may be optimized to perform specific processing tasks, such as specific signal processing, security, data mining, and artificial intelligence functions, and/or to support specific hardware coupled to IHS 200. FPGA card 220 may include one or more physical and/or logical sensors. As specialized computing components, FPGA cards may be used to support large-scale computational tasks that may result in the FPGA card 220 generating significant amounts of heat. In order to protect specialized FPGA cards from damaging levels of heat, FPGA card 220 may be outfitted with multiple temperature sensors. FPGA card 220 may also include logical sensors that are sources of metric data, such as metrics reporting numbers of calculations performed by the programmed circuitry of the FPGA. The FPGA card 220 may also include a management controller 220a that may support interoperation was the remote access controller 255 via a sideband device management bus 275a.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 100. In embodiments where storage drives 240a-n are hot-swappable devices that are received by bays of chassis, the storage drives 240a-n may be coupled to IHS 200 via couplings between the bays of the chassis and a midplane of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

As illustrated, storage controller 230 may be instrumented with a controller or other logic unit 230a that supports a sideband management connection 275c with remote access controller 255. Via the sideband management connection 275c, storage controller 230 may be configured to operate as a source of telemetry data regarding the operation of storage drives 240a-n. For instance, controller 230a may collect metric data characterizing the performance of individual storage drives 240a-n, such as available storage capacity and data transfer rates, as well as environmental properties, such as storage drive temperatures. In some embodiments, storage controller 230 may utilize this data in tracking storage drive 240a-n capacity utilization by individual virtual machines operating on IHS 200, thus supporting tracking of storage space usage by these virtual machines and in reducing the resource footprints of these virtual machines.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

In some embodiments, remote access controller 255 may also be directly coupled via I2C couplings 275d with one or more sensors 280, such as sensors that provide measurements of ambient inlet temperatures, outlet airflow temperatures and temperatures at various locations within IHS 200. Sensors 280 coupled directly to remote access controller 255 may also be used in implementing security protocols, such as intrusion detection sensors and user proximity sensors.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 260, 280 of an IHS via a sideband bus interface. For instance, messages utilized in device management may be transmitted using I2C sideband bus connections 275a-e that may be individually established with each of the respective managed devices 220, 225, 230, 260, 280 through the operation of an I2C multiplexer 255d of the remote access controller. As illustrated, certain of the managed devices of IHS 200, such as FPGA cards 220, network controller 225, storage controller 230 and power management unit 260, are coupled to the IHS processor(s) 205 via an in-line bus 215, such as a PCIe root complex, that is separate from the I2C sideband bus connections 275a-e used for device management.

In certain embodiments, the service processor 255a of remote access controller 255 may rely on an I2C co-processor 255b to implement sideband I2C communications between the remote access controller 255 and managed components 220, 225, 230, 260, 280 of the IHS. The I2C co-processor 255b may be a specialized co-processor or micro-controller that is configured to interface via a sideband I2C bus interface with the managed hardware components 220, 225, 230, 260, 280 of IHS. In some embodiments, the I2C co-processor 255b may be an integrated component of the service processor 255a, such as a peripheral system-on-chip feature that may be provided by the service processor 255a. Each I2C bus 275a-e is illustrated as single line in FIG. 2. However, each I2C bus 275a-e may be comprised of a clock line and data line that couple the remote access controller 255 to I2C endpoints 220a, 225a, 230a, 260a, 280a on each of the managed components.

As illustrated, the I2C co-processor 255b may interface with the individual managed devices 220, 225, 230, 260, 280 via individual sideband I2C buses 275a-e selected through the operation of an I2C multiplexer 255d. Via switching operations by the I2C multiplexer 255d, a sideband bus connection 275a-e may be established by a direct coupling between the I2C co-processor 255b and an individual managed device 220, 225, 230, 260, 280. In providing sideband management capabilities, the I2C co-processor 255b may each interoperate with corresponding endpoint I2C controllers 220a, 225a, 230a, 260a, 280a that implement the I2C communications of the respective managed devices 220, 225, 230, 260, 280. The endpoint I2C controllers 220a, 225a, 230a, 260a, 280a may be implemented as dedicated microcontrollers for communicating sideband I2C messages with the remote access controller 255, or endpoint I2C controllers 220a, 225a, 230a, 260a, 280a may be integrated SoC functions of a processor of the respective managed device endpoints 220, 225, 230, 260, 280.

In some embodiments, remote access controller 255 may utilizes sideband management connections 275a-e in detecting various type of events, such as error conditions, and collecting telemetry data from managed devices 220, 225, 230, 260, 280. For instance, remote access controller 255 may detect error condition signals and telemetry transmitted by managed devices 220, 225, 230, 260, 280 via the sideband connections 275a-e.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3A:
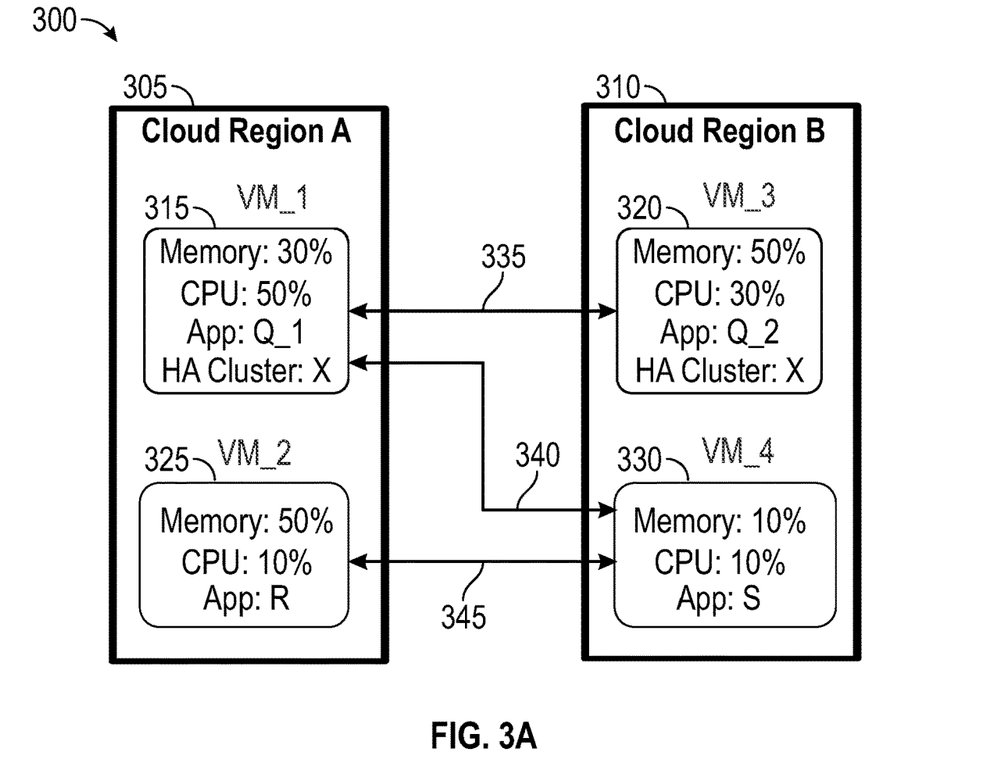
FIG. 3A is a diagram illustrating certain components of a system supporting cloud deployments that include virtual machines interoperating across two different cloud regions.

FIG. 3A is a diagram illustrating certain components of a system supporting cloud deployments that include virtual machines that interoperate across two different cloud regions. In the illustrated cloud deployment 300, three software applications, identified as applications Q, R, and S, are in operation, with two instances Q_1 and Q_2 of application Q in operation. Such software applications may be related in various manners and may be used in support of a wide range of computing functions. As illustrated, the three software applications operate within four virtual machines 315, 320, 325, 330 that are distributed between two cloud regions 305, 310.

In some instances, the IHSs that are used to implement cloud deployments may be dispersed at various locations, such as in geographically distributed data centers, in order to mitigate the risk of data losses and to support low-latency availability of cloud resources to geographically distributed users. Various types of cloud regions may be defined within these geographically distributed data centers. For instance, two cloud regions may be defined as separate data centers, or as different racks or areas within the same data center, with the greater amount of physical separation between two cloud regions providing improved availability and risk mitigation.

In the illustrated embodiment, two cloud regions 305, 310 are used to support two instances Q_1 and Q_2 of application Q, with the different instances Q_1 and Q_2 operating in the different cloud regions 305, 310. In such a scenario, application Q may be specified as a high-availability software application during the configuration of cloud deployment 300. For instance, an administrator configuring the cloud deployment 300 may specify that application Q must be available in two different cloud regions and/or in two different geographic regions. Accordingly, in implementing cloud deployment 300, virtual machine 315 is instantiated and used to operate one instance Q_1 of the application in cloud region 305 and virtual machines 320 is instantiated and used to operate the second instance Q_2 of the application in cloud region 310. In some instances, virtual machines 315 and 320 may be designated as members of a high-availability cluster, denoted as HA (high availability) Cluster X in FIG. 3A, based on hosting instances Q_1 and Q_2 of application Q that has been designated as a high-availability application.

In most such scenarios, the separate instances Q_1 and Q_2 of high-availability application Q interoperate across the cloud regions 305, 310 in order to provide users with a synchronized experience in using the application Q such that users are unable to distinguish between use of the separate instances Q_1 and Q_2. As such, the cloud deployment 300 supports a communication channel 335 by which the two virtual machines 315 and 320 may exchange information used in support of the separate instances Q1 and Q2 of high-availability application Q. In various different scenarios, the amount of data exchanged via such a communication channel 335 between separate instances of a high-availability software application may vary significantly.

As illustrated, cloud deployment 300 also includes application R operating on virtual machine 325 in cloud region 305 and application S operating on virtual machine 330 in cloud region 310. Unlike application Q, which has been designated as requiring high-availability, applications R and S are available through a single instance from a single cloud region, but may be migrated freely between the two different cloud regions 305, 310. In some scenarios, applications R and S may operate in support of the main application Q. Accordingly, instance Q_1 may utilize a communication channel 340 in order to communicate between virtual machines 315 and 330, thus allowing instance Q_1 to interoperate with application S. For example, application Q may be a sales application that has been designated as high-availability and thus implemented via instances Q_1 and Q_2 in the different cloud regions 305, 310, where instance Q_1 may support a secure communication channel 340 by which financial information may be queried from sales application S. In turn, financial application S may similarly utilize a communication channel 345 to query application R for historical pricing information.

In many scenarios, cloud deployments are configured using capacity reservations in order to ensure sufficient IHS resources are available to support the software applications at a requisite level of availability, such as according to availability conditions set forth in a service level agreement. For instance, IHS capacity reservations may specify an allocation of IHS memory, storage space and/or processing resources that are reserved for exclusive use by virtual machines 315, 320, 325, 330 that implement a cloud deployment 300. Such capacity reservations effectively ensure a requisite level of IHS resource availability for use in supporting a cloud deployment, but can also result in significant inefficiencies.

In some scenarios, inefficiencies in IHS resource capacity reservations may result from such capacity reservations being initially selected and configured with limited visibility into the amount of IHS resources that will actually utilized once the cloud deployment is put into operation. For example, overly conservative estimates that reserve large amounts of IHS memory for use by a cloud deployment may result in significant portions of that reserved memory capacity of the IHS remaining unused. Processor time and storage space may similarly be reserved and remain unused due to inaccurate estimates of IHS resource levels that will be actually used by the cloud deployment.

In addition to such inaccurate capacity reservations resulting in hardware resources of an IHS remaining idle, such configurations that include unused capacity reservations may result in needless financial expenditures. In some cloud environments, users are charged for cloud deployments based on the IHS capacity reservations that are specified for the deployment. For instance, a user may be charged for cloud deployments based, at least in part, based on a cost for the processing resources that are reserved, the amount of memory that is reserved and amount of storage space that is reserved. In some instances, the cost of a cloud deployment may also be based on the amount of network bandwidth that is utilized by the cloud deployment, especially the network bandwidth used in communications between components of the cloud deployment that are located in different cloud regions, such as the communication links 335, 340, 345 of the scenario illustrated in FIG. 3A. In some scenarios, these capacity reservations may be further utilized to assign the cloud deployment into a service tier, with higher service tiers charging higher rates for units of resource utilization, such as a rate that is charged for each gigabyte of memory that is reserved, and lower service tiers charging lower rates. Inefficient capacity reservations thus result in unused IHS resources remaining idle and also result in unnecessary charges incurred by users requesting cloud deployments. Accordingly, embodiments provide tools by which resources used in support of cloud deployments may be collapsed into more efficient configurations.

Figure 4:
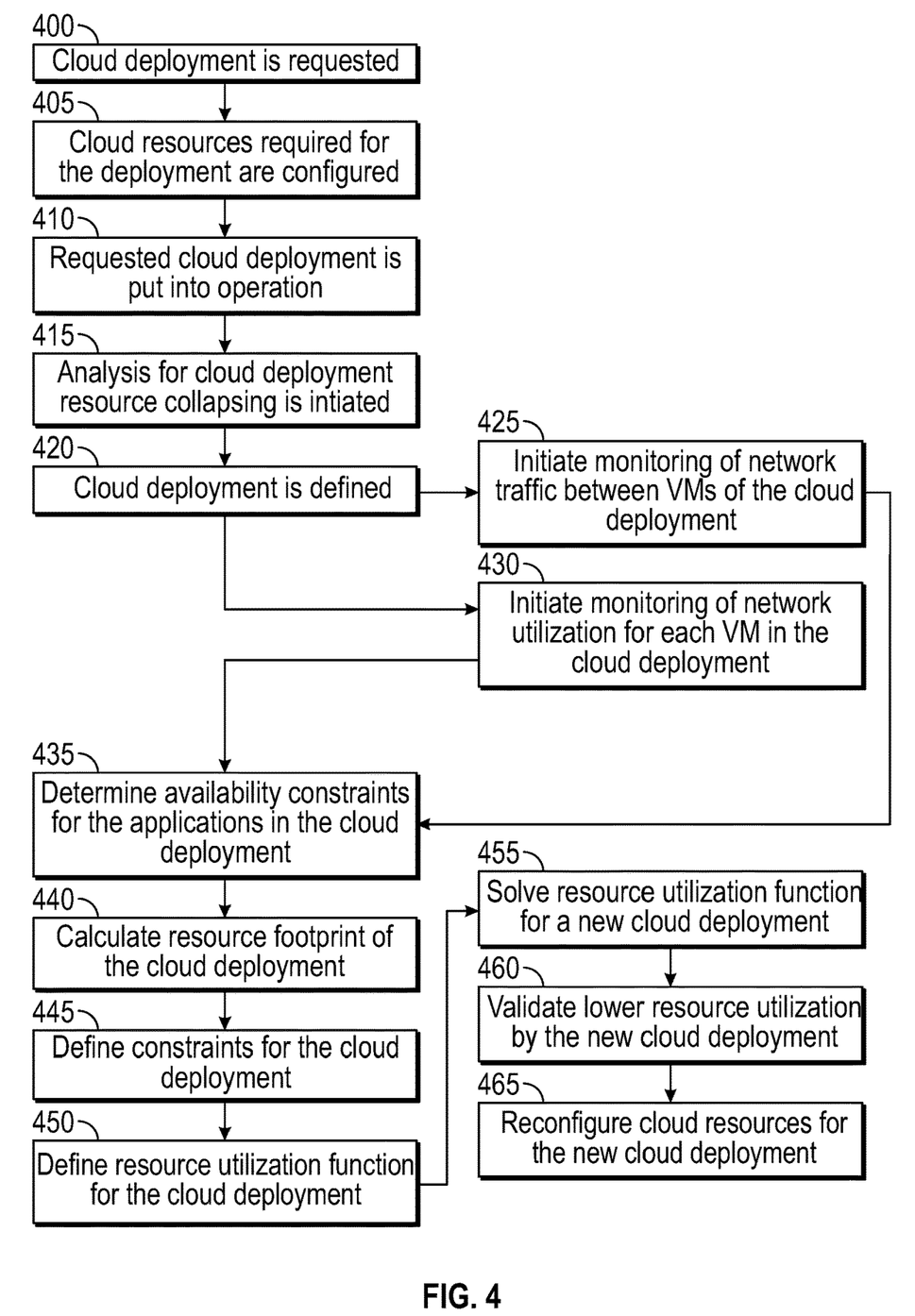
FIG. 4 is a flowchart describing certain steps of a method, according to some embodiments, for collapsing of resources used in cloud deployments.

FIG. 4 is a flowchart describing certain steps of a method, according to some embodiments, for collapsing of resources used in cloud deployments. Some embodiments may begin, at 400, with a cloud deployment being requested for use in providing operation of one or more software applications. For example, an individual may request the cloud deployment of FIG. 3A that provides use of applications Q, R and S. As described, one or more of these applications may be designated as requiring high-availability. In some scenarios, the amount of availability for an application may be specified by a number of different cloud regions from which different instances of the application must operate. In other instances, a number of different geographic regions or specific locations may be specified for the different instances of a high-availability application.

At 405, the cloud resources for the requested cloud deployment are identified and configured. As described, the cloud resources for use by a cloud deployment may be specified as capacity reservations that specify amounts of IHS resources that are reserved for use by the cloud deployment. In such instances, portions of IHS memory, storage resources and processing capabilities may be identified and denoted as being for use by a particular cloud deployment. The virtual machines that will be used to implement the cloud deployment may also be defined and configured for use of the IHS resources that have been reserved for use by the cloud deployment. In some scenarios, a separate virtual machine may be specified and configured for supporting each different software application and for supporting each different instance of a high-availability software application, such as in the scenario of FIG. 3A. Based on these configurations, at 410, the cloud deployment is put into operation, with the specified virtual machines providing use of software applications, with availability of some applications provided across multiple cloud regions.

With the cloud deployment in operation, at 415, an analysis of resource utilization by the cloud deployment is requested, where the analysis is performed according to the embodiments described herein. In different scenarios, the cloud deployment being analyzed may be in operation for varying amounts of time before embodiments are invoked, such as by a user seeking to reduce the resource footprint of a cloud deployment, and thus reduce the financial cost of the cloud deployment. Accordingly, through use of embodiments, inefficient initial configurations for cloud deployments may be improved through collapsing of the resources that are utilized to support the cloud deployment.

The resource footprint analysis of the cloud deployment may be initiated, at 420, through the definition of the cloud deployment. In some embodiments, determining the definition of a cloud deployment may include identifying each of the virtual machines that are in use by the cloud deployment, as well as the cloud regions in which each of the virtual machines is deployed. Determining the definition of a cloud deployment may also include identifying the software applications that are supported by the cloud deployment, and whether any of the software applications have been designated as requiring high-availability. In some embodiments, these aspects that define a cloud deployment may be identified through queries to APIs supported by the cloud service that is providing the cloud deployment. In some embodiments, some of these aspects that may be used to define a cloud deployment may be specified by a user that has initiated the resource footprint analysis.

With the cloud deployment defined, embodiments may initiate various tools for monitoring resource utilization by the defined virtual machines of the deployment. As illustrated in FIG. 4, at 430, embodiments may initiate monitoring utilization of IHS resources by each of the individual virtual machines. For example, embodiments may initiate monitoring of the processing resources, memory and/or storage space utilized by each of the individual virtual machines. In some embodiments, such monitoring may be implemented through instrumentation of virtual machines to collect and report resource utilization information. In some embodiments, such monitoring may be additionally or alternatively implemented through capabilities of the IHS, such as of the various controllers described with regard to FIGS. 1 and 2, that may be configured to track the use of the IHS resources by individual virtual machines.

In some embodiments, the collected resource utilization information may be used to identify on the use of these resources by each individual virtual machine of the deployment. For instance, utilization of the processor, memory and/or storage resources may be determined for each of the virtual machines, where observed resource utilizations may be characterized as a percentage of maximum capabilities. For example, observed memory utilization by a virtual machine may be specified as a percentage of the maximum memory resources that are allowed for use by the virtual machine, such as based on capacity reservations, where the observed memory utilizations may be a peak observed memory utilization, an average utilization or various other metrics for characterizing utilization of an IHS resource. In the same manner, the observed utilization of processor and storage resources by a virtual machine may be specified as percentages of maximum allowed use of processor and storage resources by the virtual machine. In the example of FIG. 3A, such monitoring may be used to establish that virtual machine 315 is utilizing 30% of the available memory and 50% of the available processing resources. In that same cloud region 305, virtual machine 325 is determined to be utilizing 50% of the available memory and only 10% of the available processing resources. In cloud region 310, virtual machine 320 utilizes 50% of its available memory and 30% of the available processing resources and virtual machine 330 is utilizing only 10% of the available memory and only 10% of the available processing resources.

As illustrated in FIG. 4, at 425, in addition to initiating monitoring of IHS resources by individual virtual machines, embodiments may also initiate monitoring of network traffic between the virtual machines of the cloud deployment. As described, high-availability software applications may be supported through deployment of multiple instances of the application disbursed in different cloud regions, which may be located in different geographic regions, and thus on different IHSs in different data centers. Also as described, in some instances, the cost of cloud deployments may be based in part on the amount of network traffic that is incurred in supporting that cloud deployment, including the communications between the components of the cloud deployment that are located in different cloud regions, such as the communications via channels 330, 340, 345 of FIG. 3A. Though collapsing of the virtual machines of a cloud deployment, certain of such communications between cloud regions 305, 310 may be eliminated, thus reducing the amount of network bandwidth that is utilized in support of the cloud deployment 300. In some embodiments, such monitoring of network traffic between virtual machines may be implemented through instrumentation of the virtual machines. In some embodiments, such monitoring may be additionally or alternatively implemented through capabilities of the IHS, such as of the network controller and/or remote access controller described with regard to 2, that may be configured to identify and track network communications between virtual machines of a cloud deployment.

With the monitoring of resource and network utilization ongoing, at 435, embodiments may initiate analysis for possible collapsing use of IHS resources into a more efficient footprint for the cloud deployment by determining the availability constraints for any of the software applications that are supported by the cloud deployment. For instance, such availability constraints may specify a number of different cloud regions in which a high-availability software application must be available. In the example of FIG. 3A, high-availability application Q is part of cluster X, which requires instances in two different cloud regions, whereas applications S and R do not have availability constraints and may thus be migrated freely between cloud regions.

At 440, a resource footprint for the cloud deployment may be calculated. In some instances, the calculated resource footprint may be a metric that characterizes the amount of IHS resources that are in use by the cloud deployment as a whole. For example, the resource footprint of a cloud deployment may be calculated based on the sum of the processor, memory and storage resources utilized by each of the virtual machines of the cloud deployment, and the sum of the network bandwidth that is utilized in the network communications between components of the cloud deployment that are in different cloud regions. In some embodiments, such resource footprints may be calculated as weighted sums of these resource utilizations by the virtual machines, where the weights may be adjusted to place greater emphasis on certain resources, such as to place greater importance in collapsing unused memory resources when memory resources are in short supply. In some embodiments, the resource footprint of a cloud deployment may be calculated as a cost for the deployment, where the cost may be calculated based on the sum of the costs incurred for each virtual machine, as determined based on the monitored utilization information. For example, where cloud deployment costs for a virtual machine are calculated based on a price for each unit of processor time utilized by the virtual machine, the collected processor utilization information is used to calculate a cost for the processor time utilized by the virtual machine. In this same manner, the prices for each unit of memory and data storage may be used to calculate a cost for the memory and storage resources utilized by each of the virtual machines. The price for each unit of network bandwidth that is utilized may be used to calculate a cost of the observed network communications by each of the virtual machines. The total cost for the cloud deployment is the sum of the cost of each of the virtual machines.

Some embodiments may continue, at 445, with the definition of the constraints for the cloud deployment. As described, one type of constraint may be a high-availability that requires deployment of an application as multiple instances dispersed across cloud regions. In the example of FIG. 3A, the set of applications in HA Cluster X are Q_1 and Q_2 such that the high-availability constraints of the cloud deployment may be specified as HA_X=set(Q_1, Q_2). The constraints may further specify that the set of applications running on a virtual machine can only contain at most one application from HA Cluster X, which may be defined as set_size(VM_Applications(VM) intersection with HA_X) <=1, where VM_Applications(VM) is the set of applications running on a virtual machine.

Utilizing these constraints for the cloud deployment, at 450, a mathematically optimizable resource utilization function may be defined for the cloud deployment, where the function accounts for the resource utilization footprint for each virtual machine. For instance, the resource utilization function that will be minimized may be based on the sum of the resource footprints for each of the virtual machines included in the deployment. The constraints on the resource utilization function that will be minimized may be specified as follows in the example of FIG. 3A.

HA_X=set(Q_1, Q_2)
union(VM_Applications(VM) for all VMs)=set(Q_1, Q_2, R, S)
set_size(VM_Applications(VM) intersection with HA_X)<=1 for all VMs
CPU_max(VM)<=100% for all VMs
Memory_max(VM)<=100% for all VMs Embodiments may continue, at 455, by solving the resource utilization function for an updated cloud deployment using a constraint optimization algorithm, where the updated deployment is optimized to reduce the overall resource footprint of the deployment, thus reducing the cost of the deployment in some cases, while satisfying the defined constraints that remain in place for the updated deployment. Embodiments may utilize various mathematical techniques for optimizing these constraints in order to reduce the resource utilization by the cloud deployment. In some embodiments, the network topology of the virtual machines of the deployment may be formulated as a constraint satisfaction problem to find a set of satisfying virtual machine topologies and then solving for minimal resource footprint for deployment of considered topology alternatives using a constraint optimization algorithm, such as linear programming methods. In some embodiments, the cloud deployment problem space may be formulated as a weighted constraint satisfaction problem that is solved for a minimal resource footprint given the full set of constraints re-formulated as a weighted constraint network. In some embodiments, heuristics may be used to guide a search through an allowable configuration space where each edge in the tree represent a single mutation to the existing cloud deployment. In such instances, branch and bound techniques may then be applied based on footprint estimates for the different mutations, such as cost estimates for the mutations, in order to narrow the search space and more quickly identify an updated cloud deployment that optimally reduces the resource footprint of the deployment.

Once the resource utilization function has been solved to produce the updated cloud deployment, at 460, some embodiments may continue by calculating the resource footprint for the updated cloud deployment and comparing it to the resource footprint of the existing deployment. In instances where the resource footprint is characterized based on the cost of the IHS resources utilized in support of a cloud deployment, the projected cost for the updated deployment may be readily compared against the cost of the existing deployment. In some instances, the cost for the updated deployment may be lower than the cost of the existing deployment both due to reduced resource consumption, but also due to incurring lower rates in response to the lower resource usages falling within lower pricing tiers that are used to calculate the cost of a cloud deployment.

In some embodiments, the updated configuration, along with an estimate of the improvements to the resource footprint for the updated configuration may be presented to the user requesting the analysis. In such embodiments, the updated configuration information may specify the virtual machines that will be collapsed in the updated deployment, and may also specify an amount of IHS resources, such as a financial cost for use of the resources, that would be saved by switching to the updated deployment configuration. In some embodiments, the user may approve switching to the updated cloud deployment. In other embodiments, the updated cloud deployment may be automatically initiated, such as based on confirming the resource savings from the updated deployment are above a certain threshold.

Figure 3B:
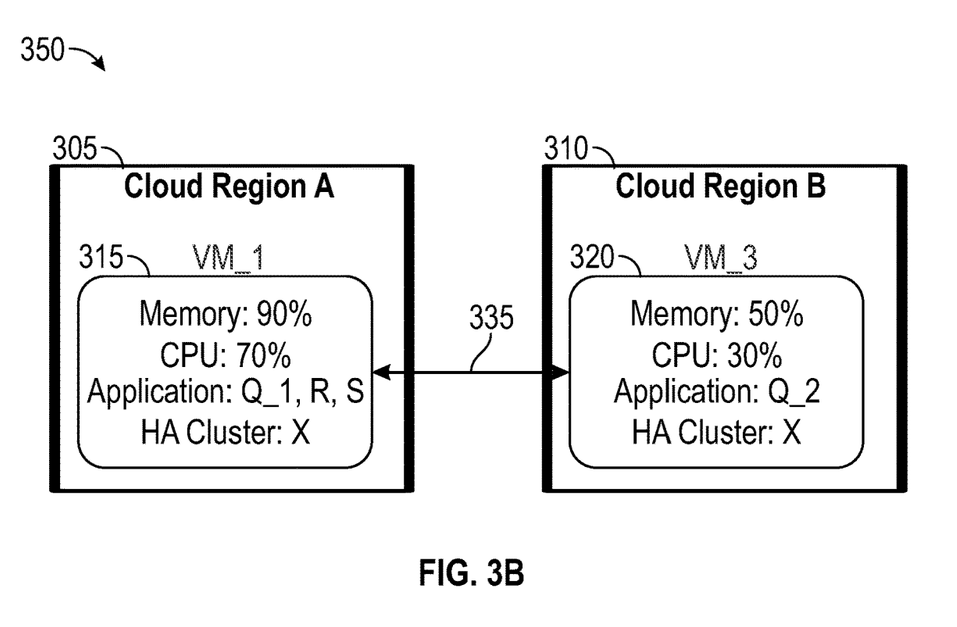
FIG. 3B is a diagram illustrating the reconfiguration by embodiments of the cloud deployment of FIG. 3A through resource collapsing such that the efficiency of the resources utilized by the virtual machines is improved.

If the updated cloud deployment is selected, at 465, the could deployment is reconfigured by collapsing one or more of the virtual machines that are currently in use by the deployment. FIG. 3B is a diagram illustrating the reconfiguration by embodiments of the cloud deployment of FIG. 3A through resource collapsing such that the efficiency of the resources utilized by the virtual machines is improved. In the updated deployment of FIG. 3B, the updated deployment generated by solving the resource utilization function results in the collapsing of applications Q, R and S into just virtual machines 315 and 320, with virtual machines 325 and 330 disabled. In some embodiments, collapsing of the four virtual machines in the original configuration into two virtual machines may in itself incur a savings in resource utilization by the updated configuration. In other embodiments, the savings in resource utilization may be additionally or alternatively based on reduced IHS resources by the updated configuration. For instance, in the updated configuration of FIG. 3B, the network connections used to support communications between components in the different cloud regions 305, 310 have been collapsed into a single network connection 335 used to support communications between instances Q_1 and Q_2 of high-availability application Q. As illustrated in FIG. 3B, due to the collapsing of the virtual machines, applications R and S and operated by virtual machine 315, along with instance Q_1, such that network communications between these components of the deployment have been obviated, thus lowering the resource footprint of the deployment.

In this manner, embodiments may collapse resources of a cloud deployment in order to reduce the resource footprint of the deployment. As illustrated in FIG. 3B, such resource footprint savings may be incurred by eliminating network traffic between multiple virtual machines by collapsing them into to a single virtual machine. In particular, network traffic costs between multiple virtual machines may be reduced by co-locating the virtual machines within the same cloud cost region. In addition, reservation costs for multiple virtual machines may be eliminated by collapsing two or more virtual machines to a single virtual machine. In some cases, the reduced reservation costs may incur additional savings due to the reduced capacity reservation costs falling within a lower-priced tier of charges for IHS capacity reservations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing a cloud deployment of one or more software applications, the method comprising:
   defining a plurality of virtual machines of the cloud deployment that are used to operate the software applications;
   monitoring network communications between the defined virtual machines of the cloud deployment;
   monitoring resource utilization by each of the defined virtual machines of the cloud deployment;
   determining availability constraints for one or more of the software applications;
   defining a resource utilization function for the deployment of the software applications for operation on a plurality of the defined virtual machines within the availability constraints;
   solving the resource utilization function to determine an updated cloud deployment of the software applications on a first portion of the defined virtual machines; and
   reconfiguring the cloud deployment to utilize the first portion of the defined virtual machines to support the software applications, wherein the reconfigured cloud deployment that utilizes the first portion of the defined virtual machines reduces a resource footprint of the cloud deployment.

2. The method of claim 1, wherein the availability constraints specify required availability of the one or more software applications in two or more cloud regions.

3. The method of claim 2, wherein the two or more cloud regions are each implemented using different groups of IHSs.

4. The method of claim 3, wherein the different set of IHSs are located at different geographic locations.

5. The method of claim 2, wherein the resource utilization function restricts separate instances of the one or more software applications to operation by virtual machines hosted in the two or more cloud regions.

6. The method of claim 1, wherein the monitored resource utilization by each of the defined virtual machines comprises at least one of a processor utilization, memory utilization and data storage utilization by the respective virtual machines.

7. The method of claim 2, wherein the monitored network communications between the virtual machines comprises network traffic between the different groups of IHSs.

8. The method of claim 1, wherein the reconfigured cloud deployment that utilizes the first portion of the defined virtual machines reduces a number of network communication channels between virtual machines on different IHSs.

9. The method of claim 1, wherein the reconfigured cloud deployment that utilizes the first portion of the defined virtual machines combines two or more of the software applications into one of the first portion of the defined virtual machines.

10. A system comprising:
a plurality of IHSs (Information Handling Systems) installed in a plurality of datacenters and hosting a cloud deployment of one or more software applications, wherein each of the IHSs comprises one or more processors and one or more memory devices storing computer-readable instructions that, upon execution by the one or more processors, cause each of the respective IHSs to run an operating system; and
an administrative software tool provided for managing the cloud deployment of one or more software applications, wherein the tool is configured to:
define a plurality of virtual machines of the cloud deployment that are used to operate the software applications;
monitor network communications between the defined virtual machines of the cloud deployment;
monitor resource utilization by each of the defined virtual machines of the cloud deployment;
determine availability constraints for one or more of the software applications;
define a resource utilization function for the deployment of the software applications for operation on a plurality of the defined virtual machines within the availability constraints;
solve the resource utilization function to determine an updated cloud deployment of the software applications on a first portion of the defined virtual machines; and
reconfigure the cloud deployment to utilize the first portion of the defined virtual machines to support the software applications, wherein the reconfigured cloud deployment that utilizes the first portion of the defined virtual machines reduces a resource footprint of the cloud deployment.

11. The system of claim 10, wherein the monitored resource utilization by each of the defined virtual machines comprises at least one of a processor utilization, memory utilization and data storage utilization by the respective virtual machines.

12. The system of claim 10, wherein the availability constraints specify required availability of the one or more software applications in two or more cloud regions.

13. The system of claim 10, wherein the reconfigured cloud deployment that utilizes the first portion of the defined virtual machines reduces a number of network communication channels between virtual machines on different IHSs.

14. The system of claim 10, wherein the reconfigured cloud deployment that utilizes the first portion of the defined virtual machines combines two or more of the software applications into one of the first portion of the defined virtual machines.

15. A computer-readable storage device having instructions stored thereon for managing a cloud deployment of one or more software applications, wherein execution of the instructions by one or more processors causes the one or more processors to:
define a plurality of virtual machines of the cloud deployment that are used to operate the software applications;
monitor network communications between the defined virtual machines of the cloud deployment;
monitor resource utilization by each of the defined virtual machines of the cloud deployment;
determine availability constraints for one or more of the software applications;
define a resource utilization function for the deployment of the software applications for operation on a plurality of the defined virtual machines within the availability constraints;
solve the resource utilization function to determine an updated cloud deployment of the software applications on a first portion of the defined virtual machines; and
reconfigure the cloud deployment to utilize the first portion of the defined virtual machines to support the software applications, wherein the reconfigured cloud deployment that utilizes the first portion of the defined virtual machines reduces a resource footprint of the cloud deployment.

16. The storage device of claim 15, wherein the monitored resource utilization by each of the defined virtual machines comprises at least one of a processor utilization, memory utilization and data storage utilization by the respective virtual machines.

17. The storage device of claim 15, wherein the availability constraints specify required availability of the one or more software applications in two or more cloud regions.

* * * * *